(12) United States Patent
Hatada

(10) Patent No.: US 8,736,971 B2
(45) Date of Patent: May 27, 2014

(54) ZOOM LENS AND IMAGE PICKUP APPARATUS INCLUDING THE SAME

(71) Applicant: Canon Kabushiki Kaisha, Tokyo (JP)

(72) Inventor: Takahiro Hatada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/756,253

(22) Filed: Jan. 31, 2013

(65) Prior Publication Data

US 2013/0201370 A1 Aug. 8, 2013

(30) Foreign Application Priority Data

Feb. 6, 2012 (JP) ................................ 2012-023338

(51) Int. Cl.
*G02B 15/14* (2006.01)

(52) U.S. Cl.
USPC ............................ 359/687; 359/676; 359/683

(58) Field of Classification Search
USPC .......................................... 359/676, 683, 687
See application file for complete search history.

(56) References Cited

U.S. PATENT DOCUMENTS 7,184,221 B2  2/2007  Misaka

FOREIGN PATENT DOCUMENTS

JP  11-295601 A  10/1999

*Primary Examiner* — Scott J Sugarman
(74) *Attorney, Agent, or Firm* — Canon USA Inc IP Division

(57) ABSTRACT

A zoom lens includes, in order from an object side to an image side, a first lens unit having a positive refractive power, a second lens unit having a negative refractive power, and a rear lens group including lens units and as a whole having a positive refractive power. Distances between the lens units change during zooming. The second lens unit includes, in order from the object side to the image side, a negative lens component and a cemented lens including a negative lens component and a positive lens component. The second lens unit includes at least five lens components. A focal length f1 of the first lens unit, a focal length f2 of the second lens unit, a refractive index Ndp of the positive lens component of the cemented lens, and a refractive index Ndn of the negative lens component of the cemented lens are set appropriately.

8 Claims, 12 Drawing Sheets

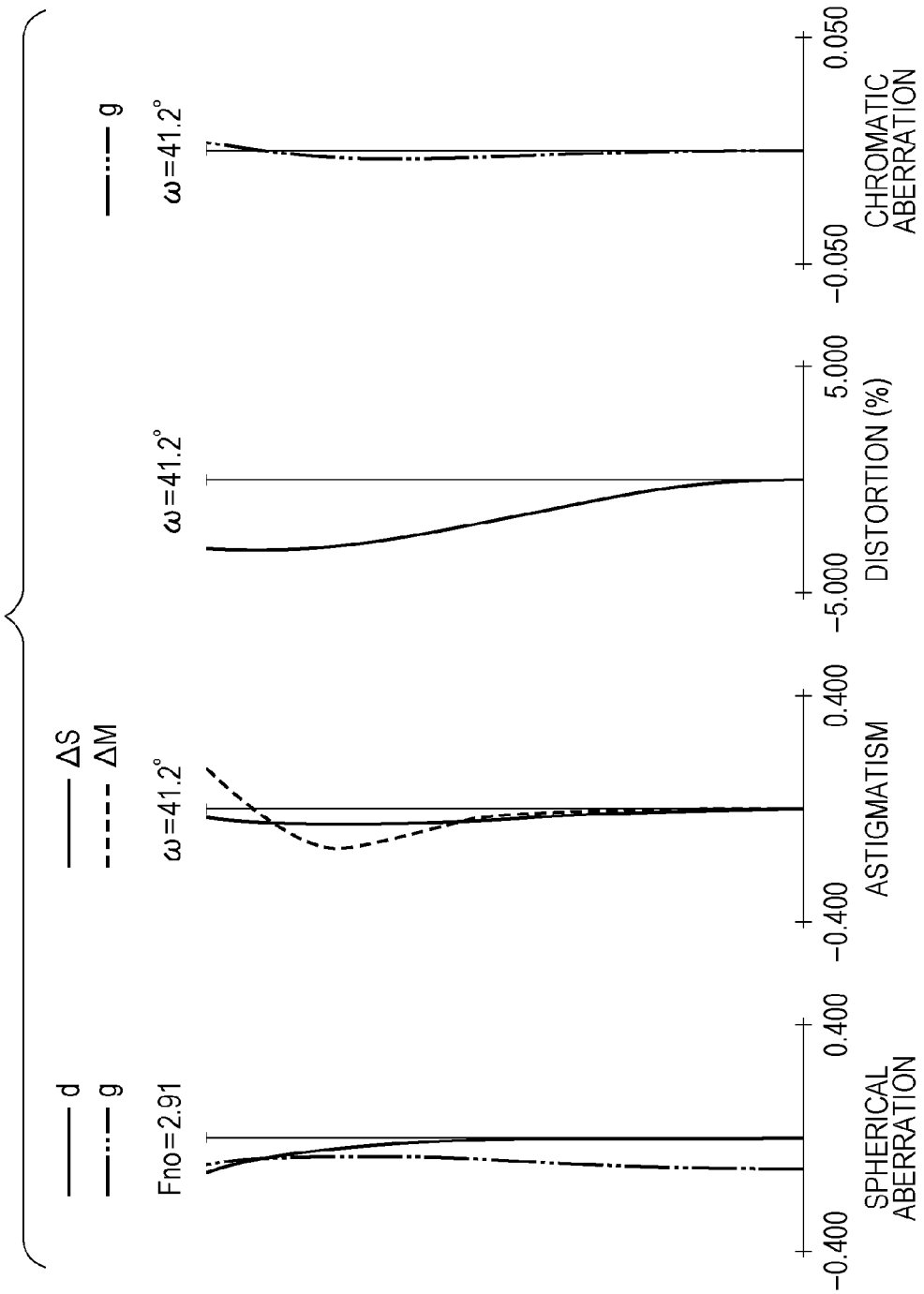

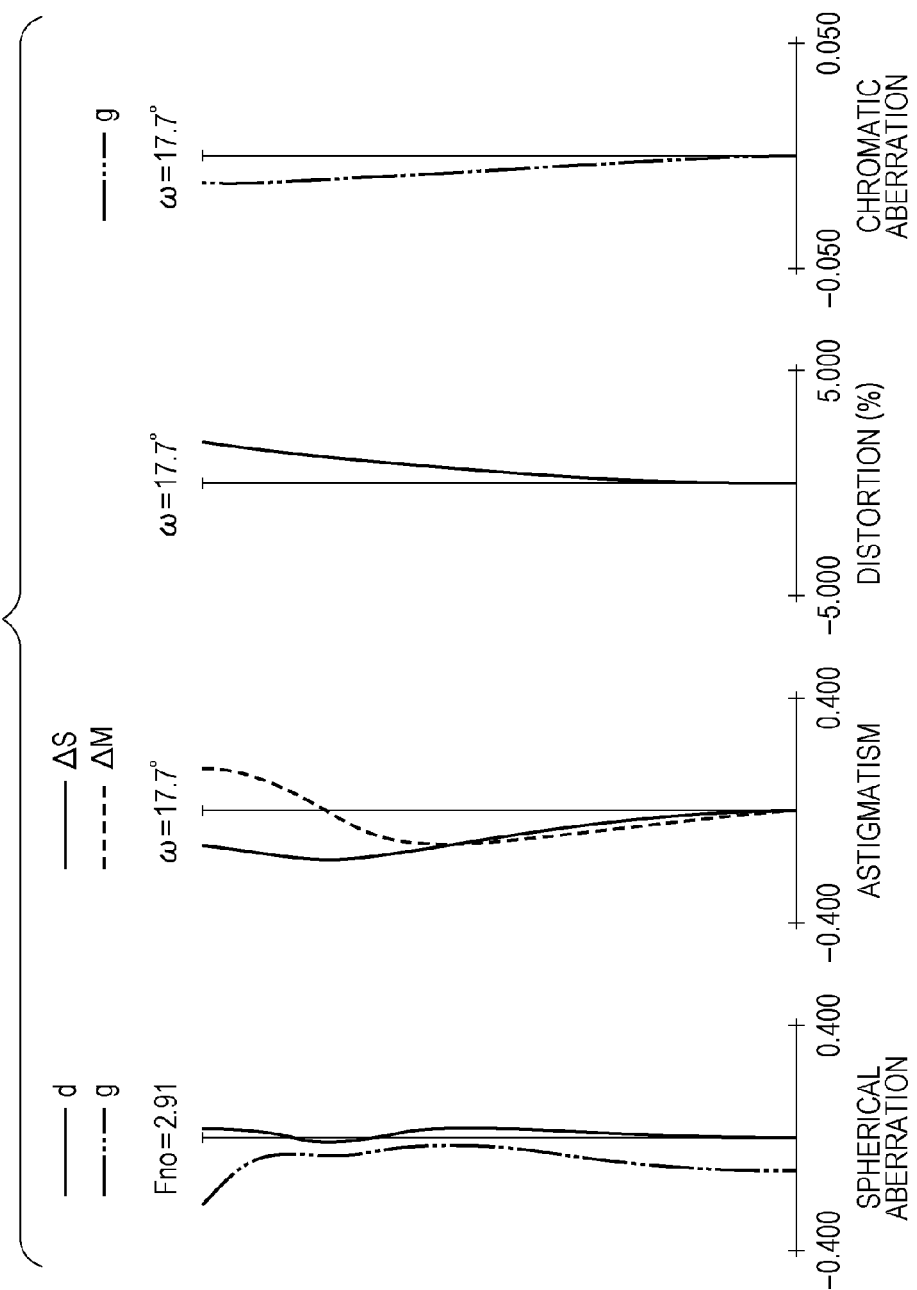

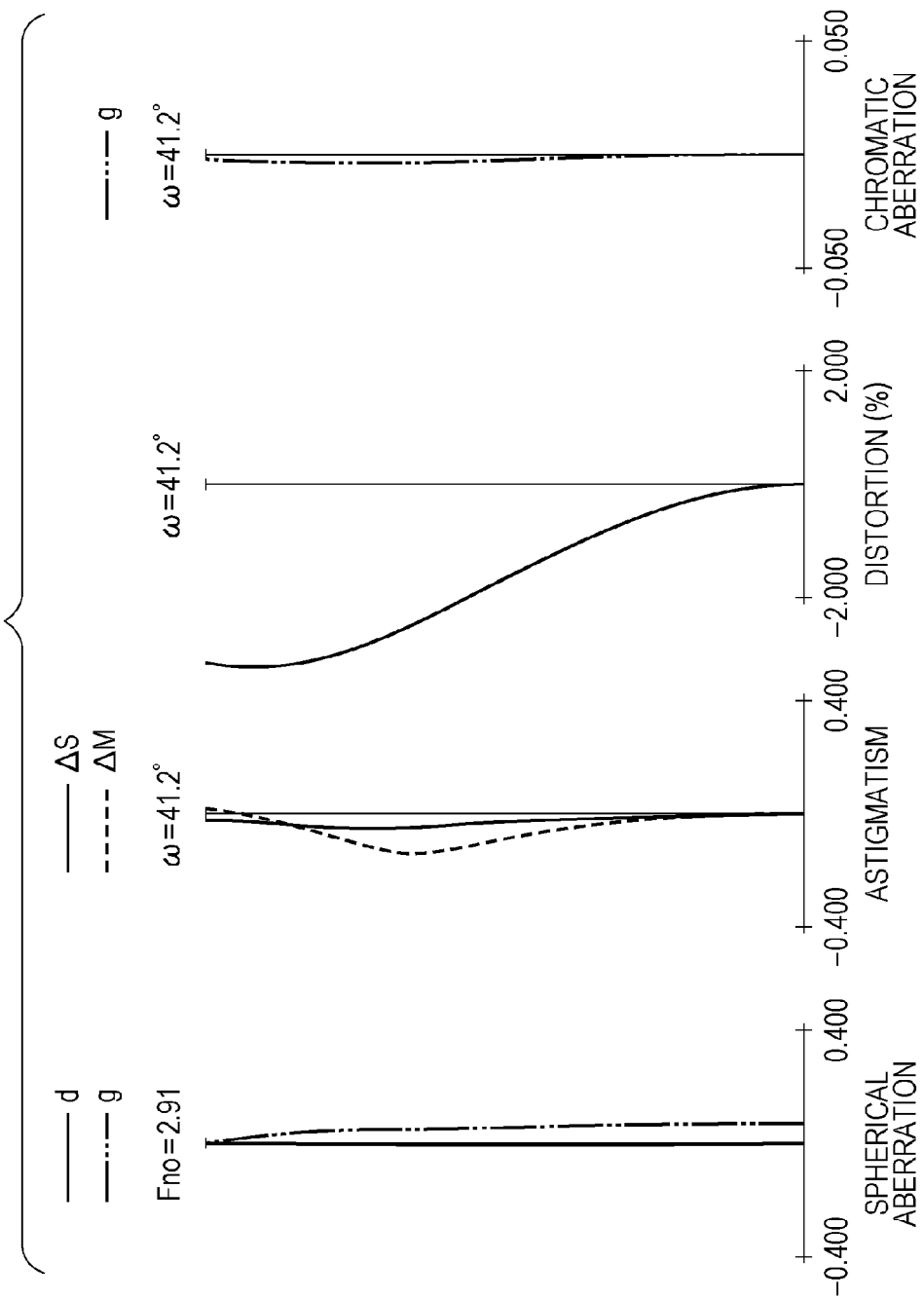

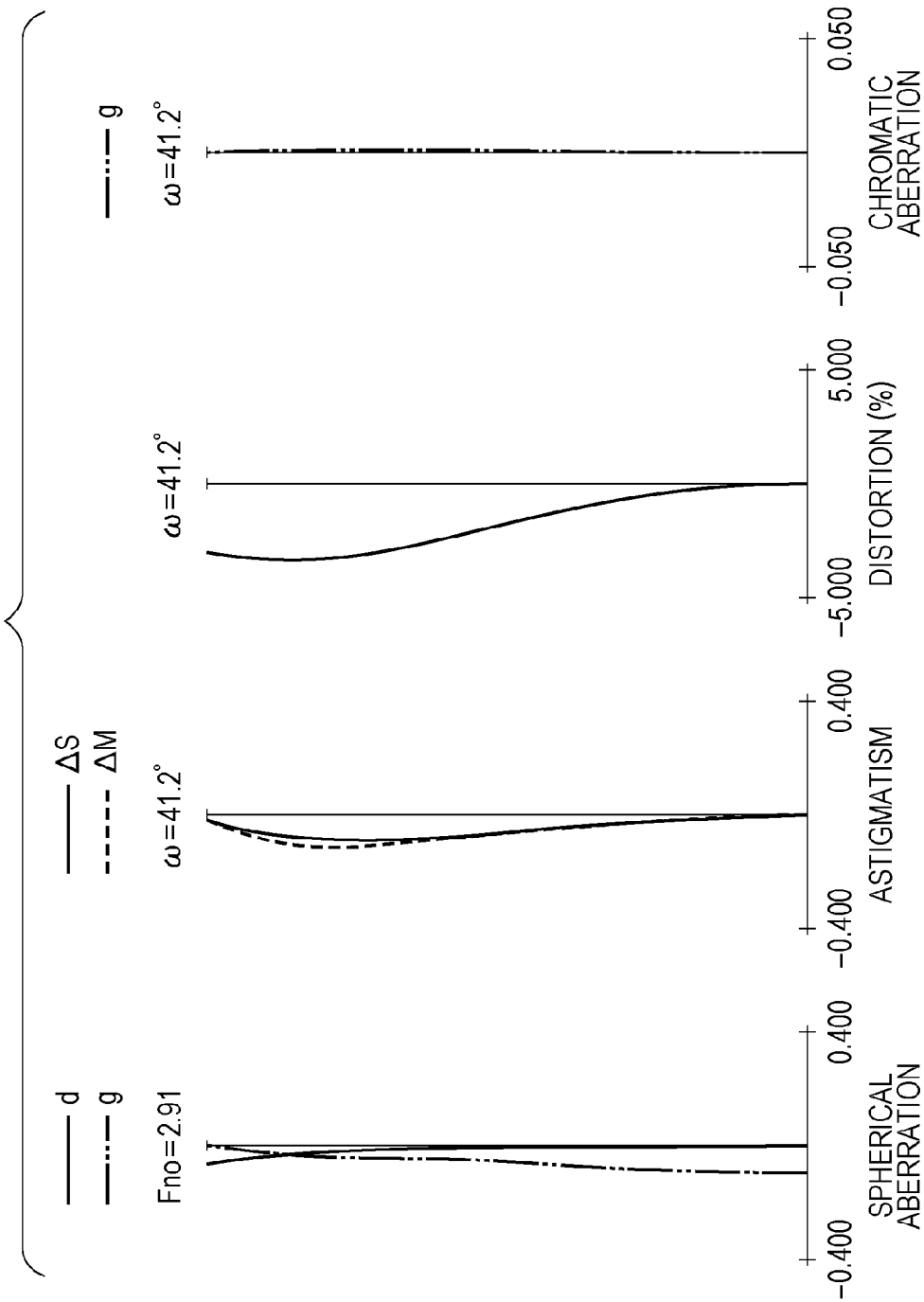

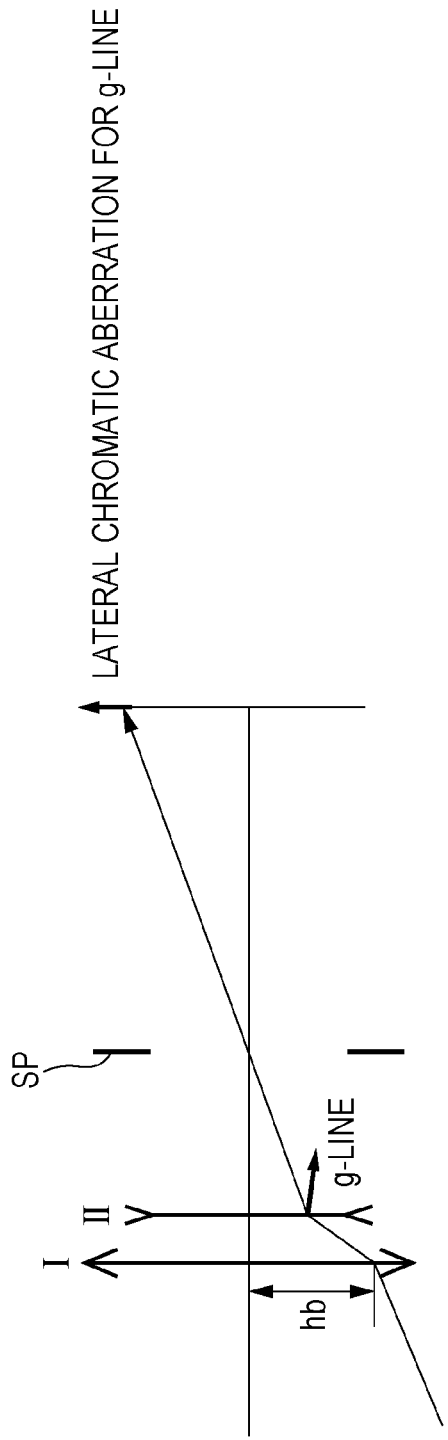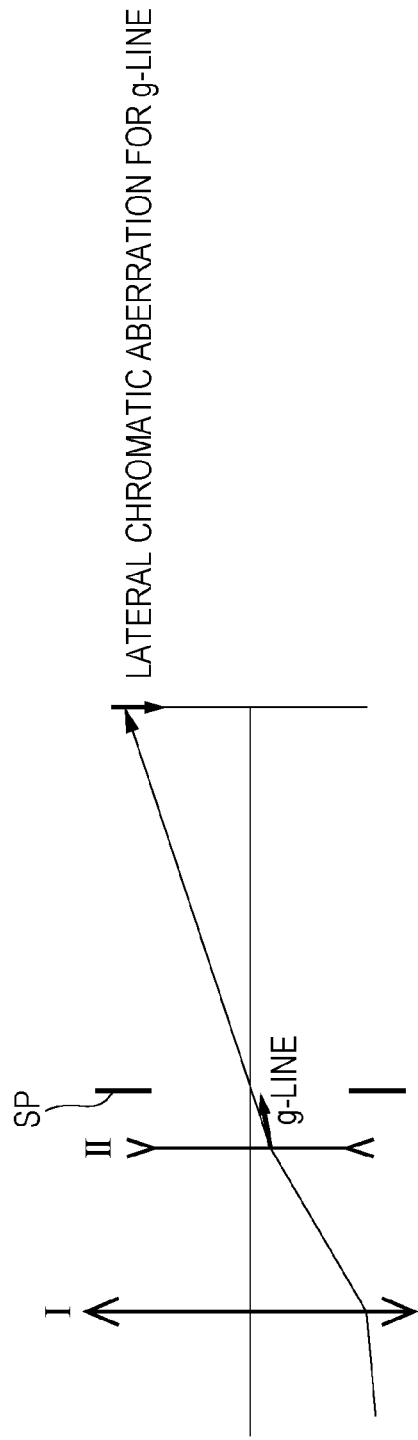

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, and is suitably applicable to image pickup apparatuses such as a digital video camera, a digital still camera, and a silver-halide-film camera.

2. Description of the Related Art

A large-aperture zoom lens in which a lens unit having a negative refractive power is provided nearest to an object-side end is advantageous in performance improvement. Therefore, various proposals concerning such a zoom lens have been provided. For example, U.S. Pat. No. 7,184,221 discloses a large-aperture zoom lens including, in order from an object side to an image side, a first lens unit having a negative refractive power, a second lens unit having a positive refractive power, a third lens unit having a negative refractive power, and a fourth lens unit having a positive refractive power.

Japanese Patent Laid-Open No. 11-295601 discloses a large-aperture zoom lens including, in order from an object side to an image side, a first lens unit having a positive refractive power, a second lens unit having a negative refractive power, a third lens unit having a positive refractive power, and a fourth lens unit having a positive refractive power. A zoom lens in which a first lens unit having a positive refractive power is provided nearest to the object-side end is advantageous in reducing the total lens length (a length from the lens surface nearest to the object-side end to an image plane) and the lens diameter.

A large-aperture zoom lens in which a lens unit having a negative refractive power is provided nearest to the object-side end tends to be large and heavy. A large-aperture zoom lens in which a lens unit having a positive refractive power is provided nearest to the object-side end is advantageous in size reduction, but is difficult to provide a sufficient back focal length if the angle of view is increased.

The zoom lens disclosed by U.S. Pat. No. 7,184,221 has an f-number as small as 2.8 and an angle of view as wide as about 84 degrees, but its lens system is of a large size.

The zoom lens disclosed by Japanese Patent Laid-Open No. 11-295601 has an f-number as small as 2.8 with its lens system being of a small size, but its angle of view at the wide-angle end is about 65 degrees at most. This zoom lens is desired to have a wider angle of view.

Moreover, variations in spherical aberration and astigmatism during zooming are not satisfactorily corrected. In addition, there remain variations in coma aberration. With such a lens configuration and such a refractive power arrangement, it is difficult to realize a zoom lens having a large aperture and an angle of view that is wider than 2ω=80 degrees.

SUMMARY OF THE INVENTION

An embodiment of the present invention provides a zoom lens having a large aperture and a wide angle of view with good optical performance at all zooming positions, and also provides an image pickup apparatus including the same.

A zoom lens according to an aspect of the present invention includes, in order from an object side to an image side, a first lens unit having a positive refractive power, a second lens unit having a negative refractive power, and a rear lens group including a plurality of lens units and as a whole having a positive refractive power. Distances between adjacent ones of the lens units change during zooming. The second lens unit includes, in order from the object side to the image side, a negative lens component and a cemented lens including a negative lens component and a positive lens component. The second lens unit includes at least five lens components. The zoom lens satisfies the following conditional expressions:

$$5.0 < |f1/f2| < 9.0$$

$$1.1 < Ndp/Ndn < 1.5$$

where f1 denotes a focal length of the first lens unit, f2 denotes a focal length of the second lens unit, Ndp denotes a refractive index of the positive lens component of the cemented lens, and Ndn denotes a refractive index of the negative lens component of the cemented lens.

Further features of the present invention will become apparent from the following description of exemplary embodiments with reference to the attached drawings.

BRIEF DESCRIPTION OF THE DRAWINGS

FIGS. 2A and 2B are diagrams illustrating longitudinal aberration curves in the zoom lens according to the first embodiment of the present invention at the wide-angle end and at a telephoto end, respectively.

FIGS. 4A and 4B are diagrams illustrating longitudinal aberration curves in the zoom lens according to the second embodiment of the present invention at the wide-angle end and at a telephoto end, respectively.

FIGS. 6A and 6B are diagrams illustrating longitudinal aberration curves in the zoom lens according to the third embodiment of the present invention at the wide-angle end and at a telephoto end, respectively.

FIGS. 8A and 8B are diagrams illustrating the principle of correction of lateral chromatic aberration in the zoom lens according to any of the embodiments of the present invention.

DESCRIPTION OF THE EMBODIMENTS

Embodiments of the zoom lens and the image pickup apparatus including the same according to the present invention will now be described.

Figure 1:
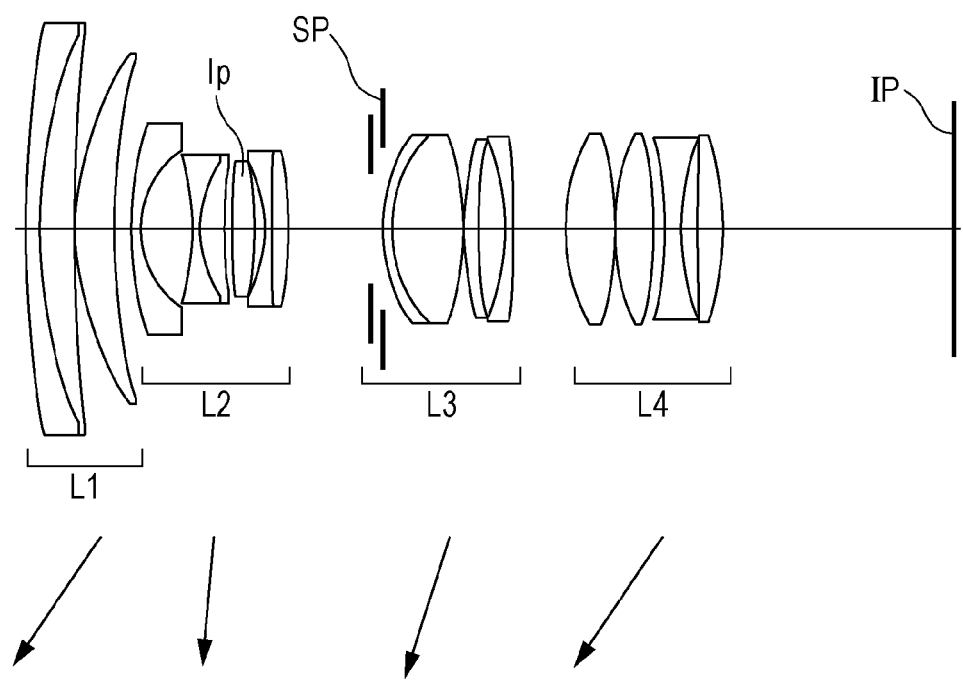
FIG. 1 is a sectional view of a zoom lens according to a first embodiment of the present invention that is at a wide-angle end.

FIG. 1 is a sectional view of a zoom lens according to a first embodiment of the present invention that is at a wide-angle end (short-focal-length end).

FIGS. 2A and 2B are diagrams illustrating longitudinal aberration curves in the zoom lens according to the first embodiment of the present invention at the wide-angle end and at a telephoto end (long-focal-length end), respectively.

Figure 3:
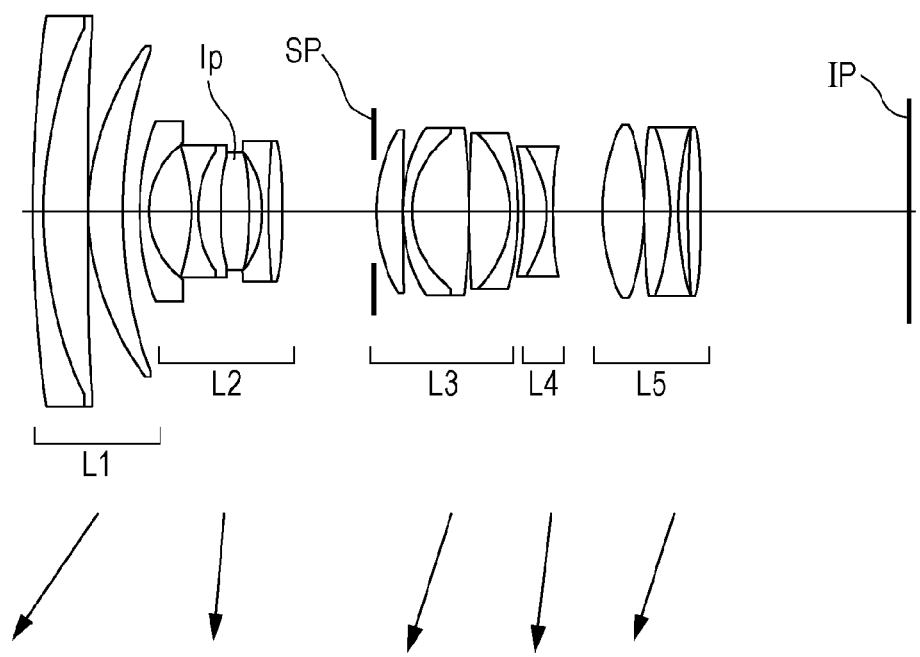
FIG. 3 is a sectional view of a zoom lens according to a second embodiment of the present invention that is at a wide-angle end.

FIG. 3 is a sectional view of a zoom lens according to a second embodiment of the present invention that is at a wide-angle end.

Figure 4B:
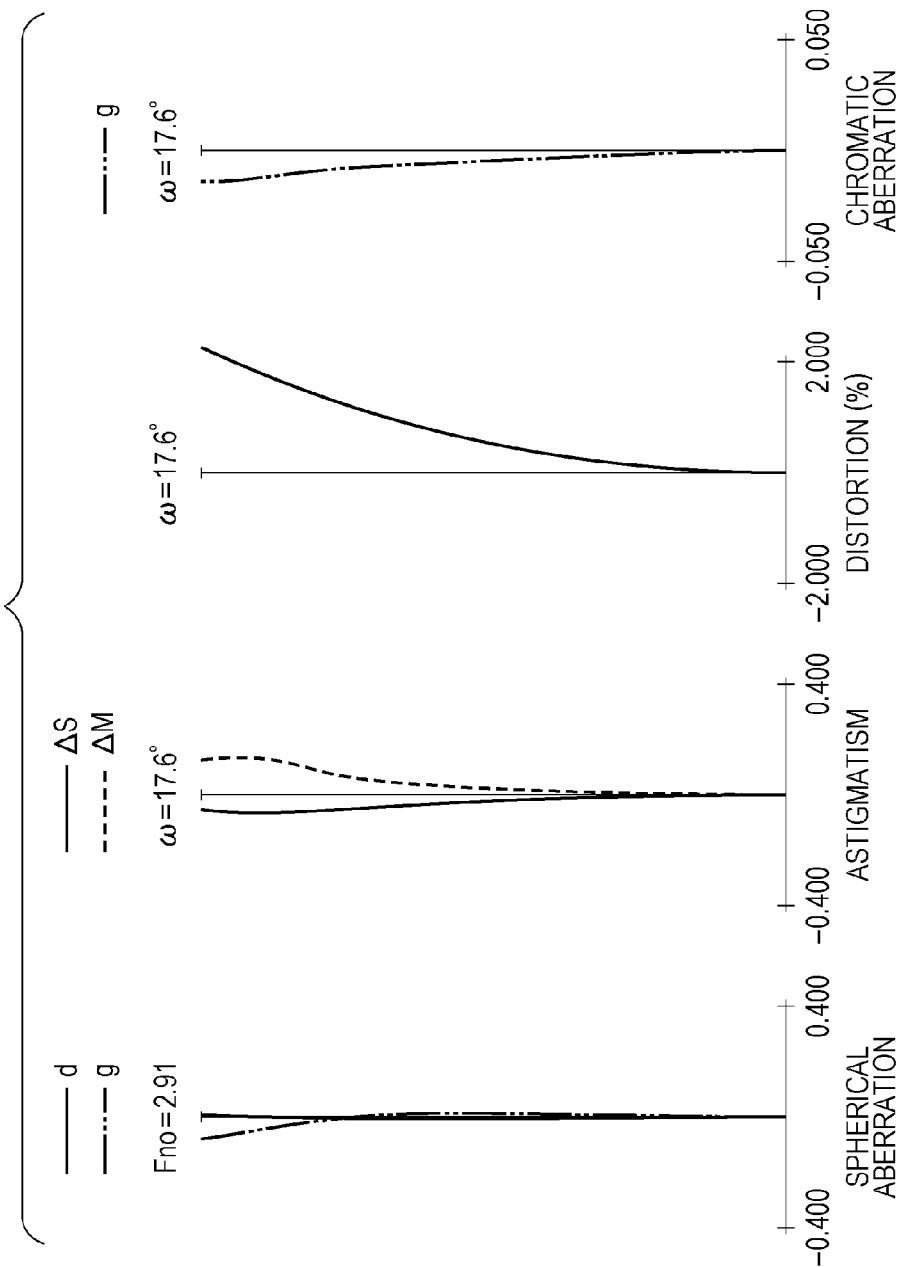

FIGS. 4A and 4B are diagrams illustrating longitudinal aberration curves in the zoom lens according to the second embodiment of the present invention at the wide-angle end and at a telephoto end, respectively.

Figure 5:
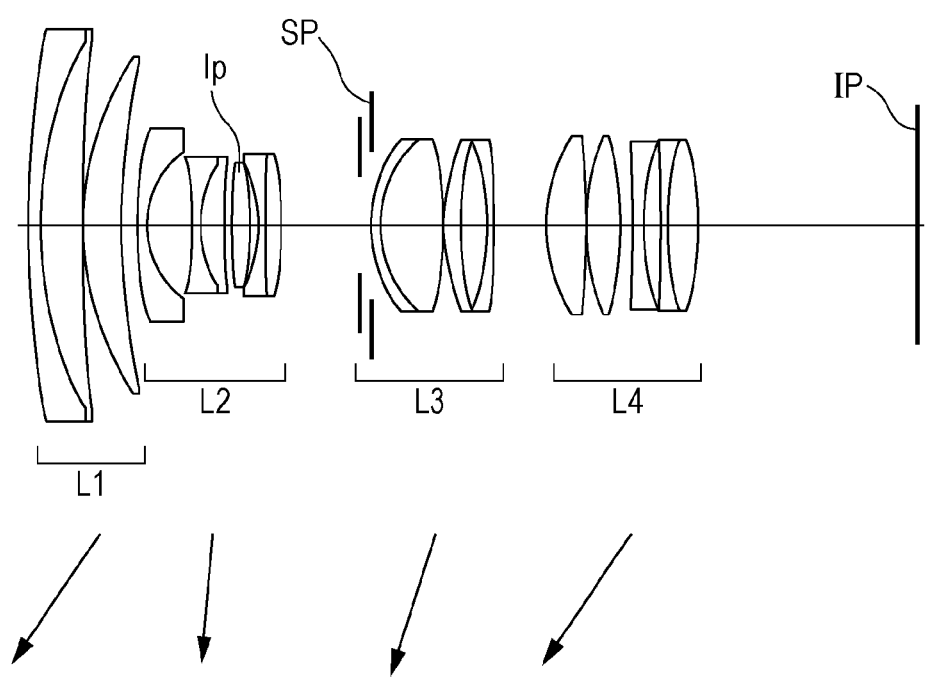
FIG. 5 is a sectional view of a zoom lens according to a third embodiment of the present invention that is at a wide-angle end.

FIG. 5 is a sectional view of a zoom lens according to a third embodiment of the present invention that is at a wide-angle end.

Figure 6B:
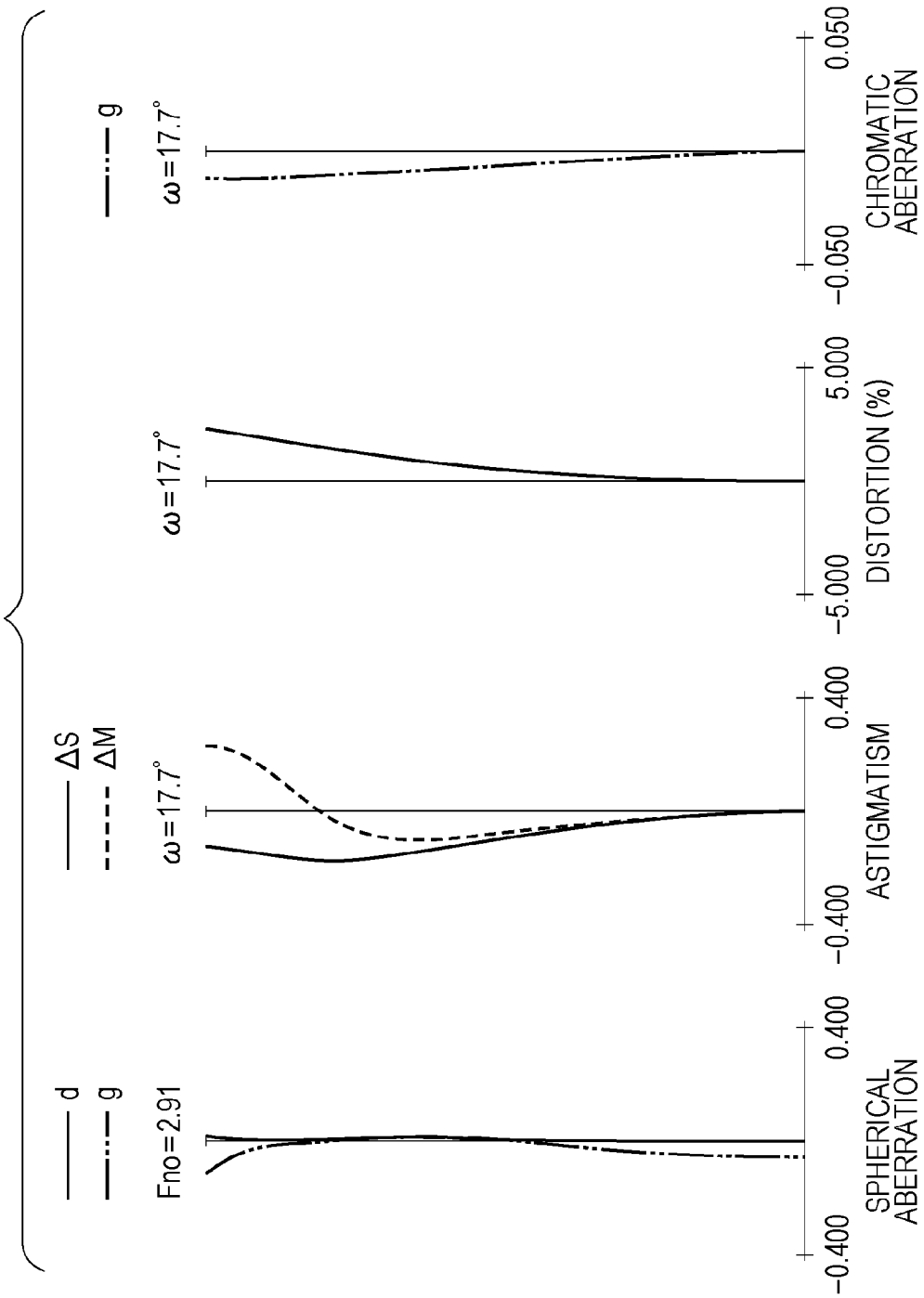

FIGS. 6A and 6B are diagrams illustrating longitudinal aberration curves in the zoom lens according to the third embodiment of the present invention at the wide-angle end and at a telephoto end, respectively.

Figure 7:
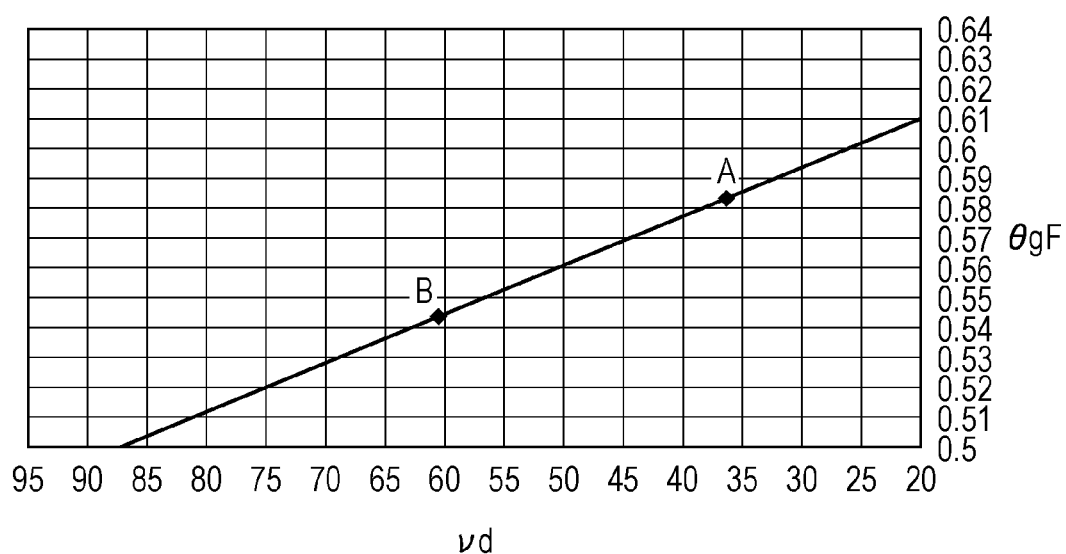
FIG. 7 is a graph illustrating the relationship between Abbe number νd and partial dispersion ratio θgF.

FIG. 7 is a graph illustrating the relationship between Abbe number νd and partial dispersion ratio θgF.

FIGS. 8A and 8B are diagrams illustrating the principle of correction of lateral chromatic aberration in the zoom lens according to any of the embodiments of the present invention.

Figure 9:
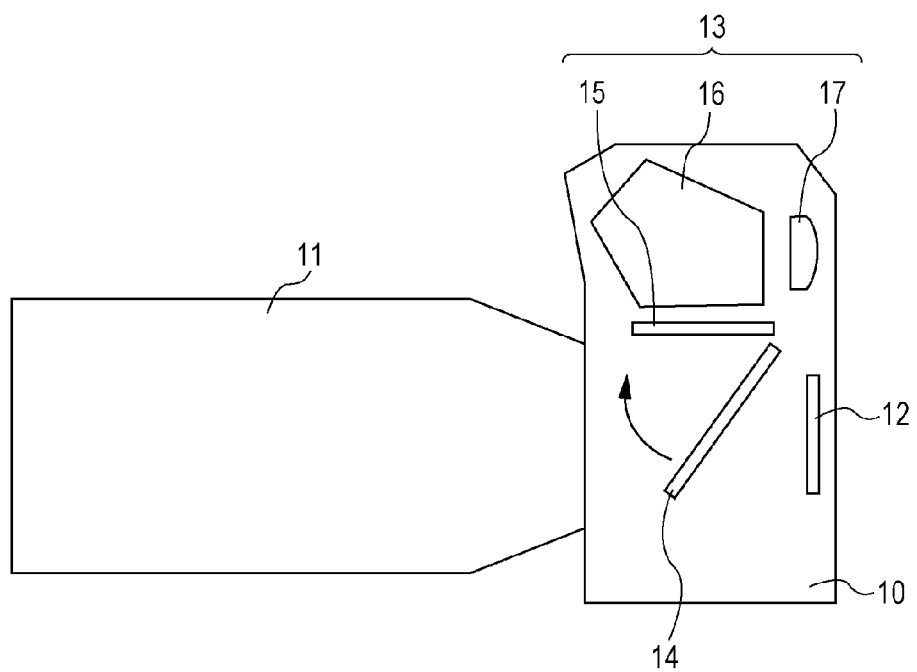
FIG. 9 is a schematic diagram of an image pickup apparatus according to an embodiment of the present invention.

FIG. 9 is a schematic diagram of a camera (image pickup apparatus) including the zoom lens according to any of the embodiments of the present invention.

In the sectional views and the diagrams illustrating the longitudinal aberration curves, the zoom lenses according to the embodiments are each focused on an object at infinity.

The zoom lenses according to the embodiments are each an imaging lens system that is applicable to image pickup apparatuses such as a video camera, a digital camera, and a silver-halide-film camera.

In the sectional views of the zoom lenses, the left side corresponds to the object side (front side), and the right side corresponds to the image side (rear side). In the sectional views of the zoom lenses, Li denotes an i-th lens unit, where i denotes the order of the lens unit counted from the object side.

The zoom lenses according to the embodiments of the present invention each include, in order from the object side to the image side, a first lens unit having a positive refractive power, a second lens unit having a negative refractive power, and a rear lens group including a plurality of lens units. The rear lens group as a whole has a positive refractive power. Distances between adjacent ones of the lens units change during zooming.

The zoom lenses illustrated in FIGS. 1 and 5 each include a first lens unit L1 having a positive refractive power (the reciprocal of focal length), a second lens unit L2 having a negative refractive power, a third lens unit L3 having a positive refractive power, and a fourth lens unit L4 having a positive refractive power. In the zoom lenses according to the first and third embodiments, the third lens unit L3 and the fourth lens unit L4 in combination form a rear lens group, and the rear lens group as a whole has a positive refractive power.

The zoom lens illustrated in FIG. 3 includes a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. In the zoom lens according to the second embodiment, the third lens unit L3, the fourth lens unit L4, and the fifth lens unit L5 in combination form a rear lens group, and the rear lens group as a whole has a positive refractive power.

The above zoom lenses each include an aperture stop SP provided on the object side of the third lens unit L3. An image plane IP is a photosensitive surface that corresponds to an image pickup surface of a solid-state image pickup device (photoelectric conversion device) such as a charge-coupled-device (CCD) sensor or a complementary-metal-oxide-semiconductor (CMOS) sensor when the zoom lens is used as an imaging optical system of a video camera or a digital still camera, or to a film surface when the zoom lens is used for a silver-halide-film camera.

In the diagrams illustrating longitudinal aberration curves, d and g denote d-line and g-line, respectively; and $\Delta M$ and $\Delta S$ denote the meridional image plane and the sagittal image plane, respectively. Lateral chromatic aberration is for g-line. Furthermore, ω denotes the half angle of view, and Fno denotes the f-number.

In each of the embodiments described below, the wide-angle end and the telephoto end refer to zooming positions at extreme ends, respectively, of a range in which the lens units are mechanically movable along the optical axis.

Arrows illustrated in each of the sectional views represent the loci along which the respective lens units move during zooming from the wide-angle end to the telephoto end. In each of the zoom lenses according to the embodiments of the present invention, distances between adjacent ones of the lens units change during zooming.

In each of the first and third embodiments of the present invention, during zooming from the wide-angle end to the telephoto end, the lens units move as represented by the respective arrows in the following manner: the first lens unit L1 moves toward the object side; the second lens unit L2 moves such that the distance between the second lens unit L2 and the first lens unit L1 is increased; the third lens unit L3 moves toward the object side such that the distance between the third lens unit L3 and the second lens unit L2 is reduced; and the fourth lens unit L4 moves toward the object side such that the distance between the fourth lens unit L4 and the third lens unit L3 is reduced. The aperture stop SP moves together with the third lens unit L3.

In the second embodiment of the present invention, during zooming from the wide-angle end to the telephoto end, the lens units move as represented by the respective arrows in the following manner: the first lens unit L1 moves toward the object side; the second lens unit L2 moves such that the distance between the second lens unit L2 and the first lens unit L1 is increased; the third lens unit L3 moves toward the object side such that the distance between the third lens unit L3 and the second lens unit L2 is reduced; the fourth lens unit L4 moves toward the object side such that the distance between the fourth lens unit L4 and the third lens unit L3 is increased; and the fifth lens unit L5 moves toward the object side such that the distance between the fifth lens unit L5 and the fourth lens unit L4 is reduced. The aperture stop SP moves together with the third lens unit L3.

Focusing is performed by moving the second lens unit L2 in an optical-axis direction. Focusing may be performed by moving all or any one of the lens units included in the zoom lens.

In the second embodiment of the present invention, the fourth lens unit L4 is movable in a direction containing a component that is perpendicular to the optical axis, whereby the image forming position is movable in the direction perpendicular to the optical axis. In this manner, image blurring that may occur when the zoom lens as a whole is shaken can be corrected. That is, image stabilization is performed.

In general, to reduce the size of a lens unit, the outside diameter (effective aperture) of the lens unit needs to be reduced. To reduce the outside diameter of the lens unit, a light beam that is to be incident on the lens unit needs to converge sufficiently on an incident side of the lens unit. To make the light beam converge, another lens unit having a strong positive refractive power can be provided on the object side of the lens unit.

In the second embodiment of the present invention, the third lens unit L3 and the fourth lens unit L4 move such that the distance between the two lens units increases more at the telephoto end than at the wide-angle end. Hence, a length sufficient for the convergence of an axial light beam that is emitted from the third lens unit L3 is easily provided at the telephoto end, where the diameter of the axial light beam increases. This facilitates the size reduction of an image-stabilizing lens unit, i.e., the fourth lens unit L4.

The optical systems, i.e., the zoom lenses, according to the embodiments each satisfy the following conditional expression:

$$5.0 < |f1/f2| < 9.0 \qquad (1)$$

where f1 denotes the focal length of the first lens unit L1, and f2 denotes the focal length of the second lens unit L2.

Conditional Expression (1) appropriately defines the ratio of the focal length of the first lens unit L1 to the focal length of the second lens unit L2. If Conditional Expression (1) is satisfied, a retrofocus power arrangement can be realized easily at the wide-angle end, realizing both an increase in the angle of view at the wide-angle end and high optical performance over the entirety of the image, with small variations in aberrations at all zooming positions.

If the upper limit of Conditional Expression (1) is exceeded, the refractive power of the second lens unit L2 becomes too strong, making it difficult to reduce variations in spherical aberration and lateral chromatic aberration that occur during zooming. Moreover, since the effect of dispersing the axial light beam that is exerted by the second lens unit L2 becomes too large, the size reduction of the rear lens group becomes difficult. If the lower limit of Conditional Expression (1) is exceeded, the retrofocus power arrangement becomes difficult to realize, making it difficult to increase the angle of view at the wide-angle end. Moreover, since the refractive power of the first lens unit L1 becomes too strong, spherical aberration at the telephoto end becomes difficult to correct.

The second lens unit L2 includes five or more lens components including, in order from the object side to the image side, a negative lens component and a cemented lens formed of a negative lens component and a positive lens component.

Since the second lens unit L2 includes, in order from the object side to the image side, a negative lens component and a cemented lens formed of a negative lens component and a positive lens component, the second lens unit L2 can easily have a retrofocus power arrangement, contributing to an increase in the angle of view at the wide-angle end. If the cemented lens includes, in order from the object side to the image side, a biconcave lens component and a positive lens component that is convex toward the object side, the cemented surface of the cemented lens has a shape concentric with non-axial rays, contributing to the correction of lateral chromatic aberration.

Since the second lens unit L2 includes five or more lens components, aberrations that occur in the second lens unit L2, which has a strong negative refractive power for increasing the angle of view of the zoom lens, can be corrected in a good manner.

The zoom lenses according to the embodiments each also satisfy the following conditional expression:

$$1.1 < Ndp/Ndn < 1.5 \qquad (2)$$

where Ndp denotes the refractive index of the positive lens component of the cemented lens included in the second lens unit L2, and Ndn denotes the refractive index of the negative lens component of the cemented lens included in the second lens unit L2.

Conditional Expression (2) appropriately defines the ratio of the refractive index Ndp of the positive lens component of the cemented lens included in the second lens unit L2 to the refractive index Ndn of the negative lens component of the cemented lens included in the second lens unit L2.

As described above in relation with Conditional Expression (1), in each of the embodiments of the present invention, a retrofocus power arrangement is realized by increasing the refractive power of the second lens unit L2, whereby the angle of view at the wide-angle end is increased. If, however, the aperture of the zoom lens becomes large with an f-number of about 2.8, it becomes difficult to reduce variations in spherical aberration, in particular, chromatic spherical aberration, that occurs during zooming.

Hence, negative spherical aberration is caused at the cemented surface of the cemented lens such that Conditional Expression (2) is satisfied. In this manner, positive spherical aberration that occurs in the second lens unit L2 having a strong negative refractive power can be reduced. Consequently, variations in spherical aberration, in particular, chromatic spherical aberration, that occurs during zooming can be reduced.

If the upper limit of Conditional Expression (2) is exceeded and the ratio of the refractive index of the positive lens component to the refractive index of the negative lens component becomes too large, the Petzval sum of the second lens unit L2 becomes a large negative value, making it difficult to reduce variations in the field curvature that occurs during zooming. If the lower limit of Conditional Expression (2) is exceeded and the ratio of the refractive index of the positive lens component to the refractive index of the negative lens component becomes small, the effect of correcting the spherical aberration at the cemented surface is reduced, making it difficult to reduce variations in spherical aberration, in particular, chromatic spherical aberration, that occurs during zooming.

The ranges of Conditional Expressions (1) and (2) may be set as follows:

$$6.0 < |f1/f2| < 8.5 \qquad (1a)$$

$$1.1 < Ndp/Ndn < 1.3 \qquad (2a)$$

If Conditional Expressions (1a) and (2a) are satisfied, it becomes easy to reduce aberrations at all zooming positions while further increasing the angle of view.

The zoom lenses according to the embodiments each can produce advantageous effects that correspond to respectively different conditional expressions given below. Each zoom lens may satisfy one or more of the conditional expressions.

Letting the refractive indices of a lens material for wavelengths of 436 nm (g-line), 486 nm (F-line), 588 nm (d-line), and 656 nm (C-line) be ng, nF, nd, and nC, respectively, the following holds:

$$vd = (nd-1)/(nF-nC)$$

$$\theta gF = (ng-nF)/(nF-nC)$$

Then, the zoom lens may satisfy the following conditional expression:

$$0 < \theta gFn - (0.6438 - 0.001682 \times vdn) < 0.1 \qquad (3)$$

where vdn and θgFn denote the Abbe number and the partial dispersion ratio, respectively, of the material of the negative lens component of the cemented lens included in the second lens unit L2.

FIG. 7 is a graph illustrating the relationship between the Abbe number vd and the partial dispersion ratio θgF of an optical glass material. In FIG. 7, point A represents a case of a product named PBM2 (vd=36.26 and θgF=0.5828) manufactured by Ohara Inc., and point B represents a case of a product named NSL7 (vd=60.49 and θgF=0.5436) manufactured by Ohara Inc. With respect to a reference line connecting point A and point B, high-dispersion glass materials each having an Abbe number vd smaller than 35 tend to be plotted above the reference line, whereas low-dispersion glass materials each having an Abbe number vd of 35 to about 60 tend to be plotted below the reference line. Some anomalous-dispersion glass materials each having an Abbe number vd of 60 or greater are plotted above the reference line. Among low-dispersion glass materials, materials that are plotted above the reference line are effective in the correction of secondary spectrum, and the effect of the correction increases as the point on the graph goes away from the reference line.

To correct lateral chromatic aberration in a good manner at all zooming positions, the coefficient of lateral chromatic aberration of the zoom lens as a whole needs to be controlled so as to be a value close to zero at all zooming positions. Here, a coefficient of lateral chromatic aberration T is expressed as follows:

$$T=\Sigma(h \sim hb \cdot \phi/vd)$$

where $\phi$ denotes the refractive power of the zoom lens, h denotes the height of incidence of an axial ray, hb denotes the height of incidence of a non-axial principal ray, and vd denotes the Abbe number. Hence, lateral chromatic aberration is dominantly influenced by a lens unit in which the height of incidence of a non-axial principal ray hb varies greatly. The influence of the second lens unit L2, in which the absolute value of the refractive power $\phi$ is large, is the second largest.

FIGS. 8A and 8B are diagrams illustrating the principle of correction of lateral chromatic aberration in the zoom lens according to any of the embodiments of the present invention. The zoom lens illustrated in FIGS. 8A and 8B includes, in order from the object side to the image side, a first lens unit L1 having a positive refractive power, a second lens unit L2 having a negative refractive power, and a rear lens group having a positive refractive power. As the focal length of the zoom lens as a whole becomes larger, the distance between the first lens unit L1 and the second lens unit L2 increases while the distance between the second lens unit L2 and the rear lens group is reduced. A non-axial principal ray that is incident on this zoom lens will now be studied. At the wide-angle end, the non-axial principal ray travels as illustrated in FIG. 8A. At the telephoto end, the non-axial principal ray travels as illustrated in FIG. 8B. The lens units provided on the image side of the aperture stop SP are not illustrated in FIGS. 8A and 8B.

In the known zoom lenses, if lateral chromatic aberrations for g-line and C-line are corrected in such a manner as to occur at the same position on the image plane, that position is shifted, with respect to a position of occurrence of lateral chromatic aberration for d-line, in a direction away from the optical axis at the wide-angle end and in a direction toward the optical axis at the telephoto end.

The above lateral chromatic aberration for g-line is corrected on the basis of the following principle. In a case where the negative lens component of the second lens unit L2 having a negative refractive power is made of an anomalous-dispersion glass material, a force that bends g-line toward the optical axis becomes stronger. This is because the refractive power of the anomalous-dispersion glass material for g-line is relatively higher than that of a normal lens material. Here, the height of incidence of a non-axial principal ray hb is smaller at the telephoto end than at the wide-angle end. Accordingly, the influence of the second lens unit L2 becomes smaller than that at the wide-angle end. That is, if Conditional Expression (3) is satisfied, the increase in lateral chromatic aberration at the telephoto end is suppressed to some extent. Hence, the secondary spectrum of lateral chromatic aberration at the telephoto end can be improved significantly.

If the lower limit of Conditional Expression (3) is exceeded, the anomalous dispersion caused by the material of the negative lens component of the cemented lens included in the second lens unit L2 becomes small, making it difficult to satisfactorily reduce lateral chromatic aberration at the wide-angle end. If the upper limit of Conditional Expression (3) is exceeded, the anomalous dispersion caused by the material of the negative lens component of the cemented lens becomes too large, making it difficult to correct longitudinal chromatic aberration.

The zoom lenses according to the embodiments may each satisfy the following conditional expression:

$$-0.1<\theta gFp-(0.6438-0.001682\times vdp)<0 \qquad (4)$$

where vdp and $\theta gFp$ denote the Abbe number and the partial dispersion ratio, respectively, of the positive lens component of the cemented lens included in the second lens unit L2.

If Conditional Expression (4) is satisfied, the increase in lateral chromatic aberration at the telephoto end is suppressed to some extent. Hence, the secondary spectrum of lateral chromatic aberration at the telephoto end can be improved significantly.

If the lower limit of Conditional Expression (4) is exceeded, the anomalous dispersion caused by the material of the positive lens component of the cemented lens becomes too large, making it difficult to correct longitudinal chromatic aberration. If the upper limit of Conditional Expression (4) is exceeded, the anomalous dispersion caused by the material of the positive lens component of the cemented lens becomes small, making it difficult to satisfactorily reduce lateral chromatic aberration at the wide-angle end.

In a case where the second lens unit L2 includes a positive lens component lp provided adjacent to and on the image side of the cemented lens, the zoom lens may satisfy the following conditional expression:

$$1.4<Ndlp<1.7 \qquad (5)$$

where Ndlp denotes the refractive index of the positive lens component lp.

If Conditional Expression (2) is satisfied, variations in spherical aberration, in particular, chromatic spherical aberration, that occurs during zooming can be reduced. However, the Petzval sum of the second lens unit L2 tends to become a large negative value. In such a case, if Conditional Expression (5) is satisfied, the Petzval sum of the second lens unit L2 can be corrected in a good manner.

If the upper limit of Conditional Expression (5) is exceeded, the Petzval sum of the second lens unit L2 becomes an excessively large negative value, making it difficult to reduce variations in the field curvature that occurs during zooming. If the lower limit of Conditional Expression (5) is exceeded, it becomes difficult to correct spherical aberration at the telephoto end.

The zoom lens may satisfy the following conditional expression:

$$0.5<|f2/fw|<0.8 \qquad (6)$$

where f2 denotes the focal length of the second lens unit L2, and fw denotes the focal length of the zoom lens as a whole at the wide-angle end.

Conditional Expression (6) defines the focal length of the second lens unit L2. If the upper limit of Conditional Expression (6) is exceeded, the length of travel of the first lens unit L1 during zooming needs to be increased. Consequently, the total lens length at the telephoto end increases disadvantageously, or, since the length of travel of the first lens unit L1 during zooming is increased, it becomes difficult to reduce the size of the zoom lens as a whole.

If the lower limit of Conditional Expression (6) is exceeded, the zoom ratio is advantageously increased. However, the Petzval sum becomes negatively large, making it difficult to correct astigmatism at all zooming positions.

In a case where the second lens unit L2 includes a positive lens component 1p provided adjacent to and on the image side of the cemented lens, the zoom lens may satisfy the following conditional expression:

$$2.0 < |flp/f2| < 4.5 \quad (7)$$

where flp denotes the focal length of the positive lens component 1p.

Conditional Expression (7) defines the focal length of the positive lens component 1p included in the second lens unit L2. If the upper limit of Conditional Expression (7) is exceeded, the refractive power of the positive lens component 1p becomes too weak and the Petzval sum of the second lens unit L2 becomes an excessively large negative value, making it difficult to reduce variations in field curvature that occurs during zooming. If the lower limit of conditional Expression (7) is exceeded, it becomes difficult to correct spherical aberration at the telephoto end.

In each of the embodiments, to further reduce variations in aberrations that occur during zooming and the size of the zoom lens while correcting aberrations in a good manner, the ranges of Conditional Expressions (3) to (7) may be set as follows:

$$0 < \theta gFn - (0.6438 - 0.001682 \times vdn) < 0.02 \quad (3a)$$

$$-0.02 < \theta gFp - (0.6438 - 0.001682 \times vdp) < 0 \quad (4a)$$

$$1.45 < Ndlp < 1.65 \quad (5a)$$

$$0.60 < |f2/fw| < 0.75 \quad (6a)$$

$$2.0 < |flp/f2| < 4.0 \quad (7a)$$

According to each of the above embodiments, a zoom lens having a large aperture and a wide angle of view with good optical performance at all zooming positions is provided.

Numerical Examples 1 to 3 corresponding to the respective first to third embodiments are given below. In each of Numerical Examples 1 to 3, i denotes the order of the surface counted from the object side; ri denotes the radius of curvature of the i-th surface; di denotes the distance between the i-th surface and the i+1-th surface; ndi and vdi denote the refractive index and the Abbe number, respectively, with respect to d-line; f denotes the focal length; and Fno denotes the f-number.

Data on aspherical surfaces are the coefficients of aspherical surfaces when the aspherical surfaces are each expressed as follows:

$$x = \frac{\frac{h^2}{R}}{1 + \sqrt{1 - (1+k)\left(\frac{h}{R}\right)^2}} + c_4 h^2 + c_6 h^2 + c_8 h^2 + c_{10} h^2 + c_{12} h^2$$

where x denotes the displacement in the optical-axis direction from a reference surface, h denotes the height in a direction perpendicular to the optical axis, R denotes the radius of a quadric surface as the base, k denotes the conic constant, and Cn denotes the n-th-order coefficient of the aspherical surface.

In addition, an expression "E-Z" denotes "$10^{-Z}$".

Furthermore, Table 1 summarizes the relationships between Conditional Expressions (1) to (7) given above and values in Numerical Examples 1 to 3.

NUMERICAL EXAMPLE 1

Unit: mm

Data on surfaces

| Surface number | r | d | nd | vd |
|---|---|---|---|---|
| 1 | 216.045 | 2.10 | 1.92286 | 18.9 |
| 2 | 84.115 | 5.93 | 1.83481 | 42.7 |
| 3 | 332.605 | 0.15 | | |
| 4 | 52.943 | 6.27 | 1.83481 | 42.7 |
| 5 | 121.076 | (Variable) | | |
| 6* | 88.860 | 0.05 | 1.52421 | 51.4 |
| 7 | 63.222 | 1.45 | 1.88300 | 40.8 |
| 8 | 15.982 | 8.56 | | |
| 9 | −43.310 | 1.15 | 1.59522 | 67.7 |
| 10 | 21.252 | 4.07 | 1.88300 | 40.8 |
| 11 | 62.227 | 1.16 | | |
| 12 | 103.049 | 3.77 | 1.59270 | 35.3 |
| 13 | −56.438 | 1.67 | | |
| 14 | −24.379 | 1.15 | 1.72916 | 54.7 |
| 15 | 253.018 | 2.80 | 1.84666 | 23.9 |
| 16 | −61.103 | (Variable) | | |
| 17 | ∞ | 1.90 | | |
| 18(Stop) | ∞ | 0.00 | | |
| 19 | 27.371 | 1.45 | 1.91082 | 35.3 |
| 20 | 22.146 | 11.86 | 1.49700 | 81.5 |
| 21 | −50.936 | 0.20 | | |
| 22* | 48.675 | 2.30 | 1.59522 | 67.7 |
| 23 | 80.867 | 4.31 | | |
| 24 | −39.283 | 1.40 | 1.83481 | 42.7 |
| 25 | −167.482 | (Variable) | | |
| 26 | 32.964 | 8.16 | 1.43875 | 94.9 |
| 27 | −58.829 | 0.15 | | |
| 28 | 39.932 | 6.23 | 1.49700 | 81.5 |
| 29 | −78.274 | 1.94 | | |
| 30* | −58.014 | 2.81 | 1.85006 | 40.2 |
| 31* | 62.716 | 2.64 | | |
| 32 | 310.584 | 3.89 | 1.49700 | 81.5 |
| 33 | −56.805 | (Variable) | | |
| Image plane | ∞ | | | |

Data on aspherical surfaces

6th surface

K = 0.00000e+000 A4 = 1.07504e−005 A6 = −1.68182e−008
A8 = 5.19696e−011 A10 = −1.28132e−013 A12 = 1.92909e−016

22nd surface

K = 0.00000e+000 A4 = −5.10421e−006 A6 = −1.20819e−008
A8 = 3.26627e−011 A10 = −2.21138e−013 A12 = 1.55087e−016

30th surface

K = 0.00000e+000 A4 = 2.20799e−005 A6 = −1.49034e−007
A8 = 4.35698e−010 A10 = −6.24320e−013 A12 = 1.78997e−016

31st surface

K = 0.00000e+000 A4 = 3.71266e−005 A6 = −1.32679e−007
A8 = 3.36842e−010 A10 = −2.39584e−013 A12 = −4.74998e−016

Other data
Zoom ratio 2.75

| | Wide angle | Intermediate | Telephoto |
|---|---|---|---|
| Focal length | 24.70 | 34.80 | 67.88 |
| F-number | 2.91 | 2.91 | 2.91 |
| Angle of view | 41.22 | 31.87 | 17.68 |
| Image height | 21.64 | 21.64 | 21.64 |
| Total lens length | 152.13 | 159.36 | 182.26 |

| Unit: mm | | | |
|---|---|---|---|
| Back focal length | 38.09 | 46.23 | 63.20 |
| d5 | 2.74 | 11.28 | 28.55 |
| d16 | 13.37 | 7.70 | 0.23 |
| d25 | 8.39 | 4.61 | 0.73 |
| d33 | 38.09 | 46.23 | 63.20 |

| Data on lens units | | |
|---|---|---|
| Unit | First surface number | Focal length |
| 1 | 1 | 101.22 |
| 2 | 6 | −16.14 |
| 3 | 17 | 59.63 |
| 4 | 26 | 43.27 |

NUMERICAL EXAMPLE 2

| Unit: mm | | | | |
|---|---|---|---|---|
| Data on surfaces | | | | |
| Surface number | r | d | nd | vd |
| 1 | 214.310 | 2.00 | 1.84666 | 23.9 |
| 2 | 85.357 | 8.60 | 1.77250 | 49.6 |
| 3 | 334.696 | 0.15 | | |
| 4 | 58.434 | 6.96 | 1.80400 | 46.6 |
| 5 | 104.363 | (Variable) | | |
| 6* | 84.749 | 0.05 | 1.52421 | 51.4 |
| 7 | 59.530 | 1.50 | 1.88300 | 40.8 |
| 8 | 16.668 | 8.28 | | |
| 9 | −46.739 | 1.20 | 1.59282 | 68.6 |
| 10 | 29.584 | 3.77 | 1.83481 | 42.7 |
| 11 | 41.274 | 0.23 | | |
| 12 | 36.615 | 4.88 | 1.51742 | 52.4 |
| 13 | −54.495 | 3.07 | | |
| 14 | −20.885 | 1.20 | 1.51742 | 52.4 |
| 15 | 113.075 | 2.54 | 1.84666 | 23.9 |
| 16 | −81.636 | (Variable) | | |
| 17(Stop) | ∞ | 0.25 | | |
| 18 | 31.551 | 3.98 | 1.49700 | 81.5 |
| 19 | 146.999 | 0.15 | | |
| 20 | 34.745 | 1.60 | 1.83400 | 37.2 |
| 21 | 18.906 | 10.75 | 1.49700 | 81.5 |
| 22 | −118.586 | 0.15 | | |
| 23* | 91.061 | 6.41 | 1.77250 | 49.6 |
| 24 | −29.797 | 1.50 | 1.83400 | 37.2 |
| 25 | −68.933 | (Variable) | | |
| 26 | −89.645 | 3.95 | 1.80809 | 22.8 |
| 27 | −24.421 | 1.20 | 1.81600 | 46.6 |
| 28* | 61.980 | (Variable) | | |
| 29 | 51.860 | 6.41 | 1.59240 | 68.3 |
| 30 | −42.592 | 0.15 | | |
| 31 | 134.500 | 4.86 | 1.49700 | 81.5 |
| 32 | −41.347 | 1.50 | 1.84666 | 23.9 |
| 33 | 58.026 | 2.31 | | |
| 34* | 191.875 | 2.31 | 1.85006 | 40.2 |
| 35 | −126.942 | (Variable) | | |
| Image plane | ∞ | | | |

Data on aspherical surfaces

6th surface

K = 0.00000e+000 A4 = 1.30747e−005 A6 = −7.43299e−009
A8 = −7.41602e−012 A10 = 7.77842e−014

23rd surface

K = 0.00000e+000 A4 = −6.87604e−006 A6 = 2.24848e−009
A8 = −1.10262e−011 A10 = 7.00033e−014

28th surface

K = 0.00000e+000 A4 = −1.07649e−006 A6 = 2.92429e−010
A8 = −8.11720e−012 A10 = 3.01831e−014

| Unit: mm | | |
|---|---|---|
| 34th surface | | |

K = 0.00000e+000 A4 = −5.49366e−006 A6 = −2.75698e−009
A8 = −8.44615e−012 A10 = −6.02441e−015

| Other data | | | |
|---|---|---|---|
| Zoom ratio 2.76 | | | |
| | Wide angle | Intermediate | Telephoto |
| Focal length | 24.70 | 34.91 | 68.25 |
| F-number | 2.91 | 2.91 | 2.91 |
| Angle of view | 41.22 | 31.79 | 17.59 |
| Image height | 21.64 | 21.64 | 21.64 |
| Total lens length | 160.64 | 169.65 | 196.67 |
| Back focal length | 38.42 | 42.01 | 53.09 |
| d5 | 3.21 | 15.77 | 40.60 |
| d16 | 17.09 | 9.94 | 1.05 |
| d25 | 0.69 | 4.30 | 9.08 |
| d28 | 9.31 | 5.71 | 0.92 |
| d35 | 38.42 | 42.01 | 53.09 |

| Data on lens units | | |
|---|---|---|
| Unit | First surface number | Focal length |
| 1 | 1 | 139.18 |
| 2 | 6 | −17.48 |
| 3 | 17 | 28.17 |
| 4 | 26 | −43.76 |
| 5 | 29 | 56.49 |

NUMERICAL EXAMPLE 3

| Unit: mm | | | | |
|---|---|---|---|---|
| Data on surfaces | | | | |
| Surface number | r | d | nd | vd |
| 1 | 203.844 | 2.10 | 1.84666 | 23.9 |
| 2 | 72.022 | 7.41 | 1.77250 | 49.6 |
| 3 | 330.893 | 0.15 | | |
| 4 | 56.152 | 6.73 | 1.77250 | 49.6 |
| 5 | 146.214 | (Variable) | | |
| 6* | 108.833 | 1.60 | 1.88300 | 40.8 |
| 7 | 16.535 | 7.96 | | |
| 8 | −46.335 | 1.15 | 1.59522 | 67.7 |
| 9 | 21.502 | 4.18 | 1.88300 | 40.8 |
| 10 | 66.987 | 1.43 | | |
| 11 | 126.217 | 3.10 | 1.59270 | 35.3 |
| 12 | −49.936 | 1.62 | | |
| 13 | −23.459 | 1.15 | 1.72916 | 54.7 |
| 14 | 432.841 | 2.76 | 1.84666 | 23.9 |
| 15 | −57.478 | (Variable) | | |
| 16 | ∞ | 1.90 | | |
| 17(Stop) | ∞ | 0.00 | | |
| 18 | 27.563 | 1.45 | 1.88300 | 40.8 |
| 19 | 21.272 | 11.03 | 1.49700 | 81.5 |
| 20 | −66.483 | 0.20 | | |
| 21 | 43.019 | 2.70 | 1.58313 | 59.4 |
| 22* | 63.198 | 4.67 | | |
| 23 | −45.003 | 1.40 | 1.72047 | 34.7 |
| 24 | −151.840 | (Variable) | | |
| 25 | 31.049 | 6.94 | 1.43875 | 94.9 |
| 26 | −216.866 | 0.20 | | |
| 27 | 47.221 | 5.86 | 1.49700 | 81.5 |
| 28 | −71.326 | 1.90 | | |
| 29* | −208.068 | 2.13 | 1.85006 | 40.2 |
| 30* | 86.193 | 2.76 | | |
| 31 | −613.677 | 1.40 | 1.83400 | 37.2 |
| 32 | 57.864 | 5.29 | 1.51633 | 64.1 |

-continued

Unit: mm

| | | |
|---|---|---|
| 33 | −61.669 | (Variable) |
| Image plane | ∞ | |

Data on aspherical surfaces

6th surface

K = 0.00000e+000 A4 = 7.24687e−006 A6 = −9.33789e−009
A8 = 2.38226e−011 A10 = −5.23831e−014 A12 = 8.03521e−017

22nd surface

K = 0.00000e+000 A4 = 5.45182e−006 A6 = 4.70739e−009
A8 = 2.06430e−013 A10 = 7.16170e−014 A12 = −2.30646e−017

29th surface

K = 0.00000e+000 A4 = 2.73159e−005 A6 = −1.56554e−007
A8 = 4.00484e−010 A10 = −7.50876e−013 A12 = 7.01430e−016

30th surface

K = 0.00000e+000 A4 = 4.42990e−005 A6 = −1.33910e−007
A8 = 3.22402e−010 A10 = −4.40140e−013 A12 = 2.46872e−016

Other data
Zoom ratio 2.75

| | Wide angle | Intermediate | Telephoto |
|---|---|---|---|
| Focal length | 24.70 | 34.93 | 67.88 |
| F-number | 2.91 | 2.91 | 2.91 |
| Angle of view | 41.22 | 31.77 | 17.68 |
| Image height | 21.64 | 21.64 | 21.64 |
| Total lens length | 154.56 | 162.05 | 185.77 |
| Back focal length | 38.08 | 46.62 | 63.32 |
| d5 | 2.75 | 11.72 | 30.30 |
| d15 | 13.76 | 7.73 | 0.23 |
| d24 | 8.79 | 4.80 | 0.74 |
| d33 | 38.08 | 46.62 | 63.32 |

Data on lens units

| Unit | First surface number | Focal length |
|---|---|---|
| 1 | 1 | 105.87 |
| 2 | 6 | −16.39 |
| 3 | 16 | 58.01 |
| 4 | 25 | 46.14 |

TABLE 1

| Conditional Expression | Numerical Example 1 | Numerical Example 2 | Numerical Example 3 |
|---|---|---|---|
| (1) | 6.27 | 7.96 | 6.49 |
| (2) | 1.18 | 1.15 | 1.18 |
| (3) | 0.014 | 0.016 | 0.014 |
| (4) | −0.009 | −0.007 | −0.009 |
| (5) | 1.59 | 1.52 | 1.59 |
| (6) | 0.65 | 0.71 | 0.66 |
| (7) | 3.8 | 2.5 | 3.7 |

An embodiment in which the zoom lens according to any of the above embodiments of the present invention is used as an imaging optical system will now be described with reference to FIG. 9. FIG. 9 illustrates a body 10 of a single-lens reflex camera with an interchangeable lens 11 to which the zoom lens according to any of the embodiments of the present invention is applied.

A photosensitive surface 12 corresponds to a silver-halide film, a solid-state image pickup device (photoelectric conversion device), or the like. An image of an object obtained through the interchangeable lens 11 is to be recorded on the silver-halide film or is to be received by the solid-state image pickup device.

The image of the object obtained through the interchangeable lens 11 is viewed through a finder optical system 13. The image of the object obtained through the interchangeable lens 11 is switchably transmitted to either the photosensitive surface 12 and the finder optical system 13 via a quick return mirror 14 that is turnable.

When an image of an object is to be viewed through the finder optical system 13, the image of the object formed on a focusing screen 15 via the quick return mirror 14 is converted into an erect image by a pentagonal prism 16 and is magnified by an eyepiece optical system 17, whereby the magnified image is viewed.

When image shooting is performed, the quick return mirror 14 turns in the direction of the arrow. Thus, the image of the object is formed and recorded on the photosensitive surface 12.

By applying the zoom lens according to any of the embodiments of the present invention to an optical apparatus such as an interchangeable lens of a single-lens reflex camera as described above, an optical apparatus having high optical performance is provided.

The present invention is also applicable in a similar manner to a single-lens reflex camera not including a quick return mirror.

The zoom lenses according to the embodiments of the present invention is also applicable in a similar manner to a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-023338 filed Feb. 6, 2012, which is hereby incorporated by reference herein in its entirety.

What is claimed is:

1. A zoom lens comprising, in order from an object side to an image side:
   a first lens unit having a positive refractive power;
   a second lens unit having a negative refractive power; and
   a rear lens group including a plurality of lens units and as a whole having a positive refractive power,
   wherein distances between adjacent ones of the lens units change during zooming,
   wherein the second lens unit includes, in order from the object side to the image side,
   a negative lens component; and
   a cemented lens including a negative lens component and a positive lens component,
   wherein the second lens unit includes at least five lens components, and
   wherein the zoom lens satisfies the following conditional expressions:

$$5.0 < |f1/f2| < 9.0$$

$$1.1 < Ndp/Ndn < 1.5$$

where f1 denotes a focal length of the first lens unit, f2 denotes a focal length of the second lens unit, Ndp denotes a refractive index of the positive lens component of the cemented lens, and Ndn denotes a refractive index of the negative lens component of the cemented lens.

2. The zoom lens according to claim 1 satisfying the following conditional expression:

$$0 < \theta gFn - (0.6438 - 0.001682 \times vdn) < 0.1$$

where νdn and θgFn denote an Abbe number and a partial dispersion ratio, respectively, of the negative lens component of the cemented lens.

3. The zoom lens according to claim 1 satisfying the following conditional expression:

$$-0.1 < \theta gFp - (0.6438 - 0.001682 \times \nu dp) < 0$$

where νdp and θgFp denote an Abbe number and a partial dispersion ratio, respectively, of the positive lens component of the cemented lens.

4. The zoom lens according to claim 1,
wherein the second lens unit includes a positive lens component (lp) provided adjacent to and on the image side of the cemented lens, and
wherein the zoom lens satisfies the following conditional expression:

$$1.4 < Ndlp < 1.7$$

where Ndlp denotes a refractive index of the positive lens component (lp).

5. The zoom lens according to claim 1 satisfying the following conditional expression:

$$0.5 < |f2/fw| < 0.8$$

where fw denotes a focal length of the zoom lens as a whole at a wide-angle end.

6. The zoom lens according to claim 1,
wherein the second lens unit includes a positive lens component (lp) provided adjacent to and on the image side of the cemented lens, and
wherein the zoom lens satisfies the following conditional expression:

$$2.0 < |flp/f2| < 4.5$$

where flp denotes a focal length of the positive lens component (lp).

7. The zoom lens according to claim 1 that forms an image on a solid-state image pickup device.

8. An image pickup apparatus comprising:
a zoom lens comprising, in order from an object side to an image side:
   a first lens unit having a positive refractive power;
   a second lens unit having a negative refractive power; and
   a rear lens group including a plurality of lens units and as a whole having a positive refractive power,
   wherein distances between adjacent ones of the lens units change during zooming,
   wherein the second lens unit includes, in order from the object side to the image side,
      a negative lens component; and
      a cemented lens including a negative lens component and a positive lens component,
   wherein the second lens unit includes at least five lens components, and
   wherein the zoom lens satisfies the following conditional expressions:

$$5.0 < |f1/f2| < 9.0$$

$$1.1 < Ndp/Ndn < 1.5$$

where f1 denotes a focal length of the first lens unit, f2 denotes a focal length of the second lens unit, Ndp denotes a refractive index of the positive lens component of the cemented lens, and Ndn denotes a refractive index of the negative lens component of the cemented lens; and
a solid-state image pickup device that receives light representing an image formed by the zoom lens.

* * * * *